No. 775,357. PATENTED NOV. 22, 1904.
T. J. WADDELL.
FERTILIZER DISTRIBUTER.
APPLICATION FILED SEPT. 24, 1903.
NO MODEL. 4 SHEETS—SHEET 3.

WITNESSES:
F. W. Riley
Chas. S. Hyer.

INVENTOR
Thos. J. Waddell.
BY Victor J. Evans
Attorney

No. 775,357. PATENTED NOV. 22, 1904.
T. J. WADDELL.
FERTILIZER DISTRIBUTER.
APPLICATION FILED SEPT. 24, 1903.
NO MODEL. 4 SHEETS—SHEET 4.

WITNESSES:
F. W. Riley
Chas. S. Hyer

INVENTOR
Thos. J. Waddell.
BY Victor J. Evans
Attorney

No. 775,357. Patented November 22, 1904.

UNITED STATES PATENT OFFICE.

THOMAS J. WADDELL, OF PHILBROOK, MONTANA, ASSIGNOR OF ONE-HALF TO CLARENCE M. GOODELL, OF PHILBROOK, MONTANA.

FERTILIZER-DISTRIBUTER.

SPECIFICATION forming part of Letters Patent No. 775,357, dated November 22, 1904.

Application filed September 24, 1903. Serial No. 174,506. (No model.)

*To all whom it may concern:*

Be it known that I, THOMAS J. WADDELL, a citizen of the United States, residing at Philbrook, in the county of Fergus and State of Montana, have invented new and useful Improvements in Fertilizer-Distributers, of which the following is a specification.

This invention relates to improvements in fertilizer-distributers; and the objects are to simplify and improve the existing art by providing a machine of the class named for the purposes intended which is of simple construction and effective in operation, which may be adjusted or regulated expeditiously.

With these and other objects and advantages in view the invention consists in the construction and arrangement of the several parts, which will be more fully hereinafter described and claimed.

Figure 1:
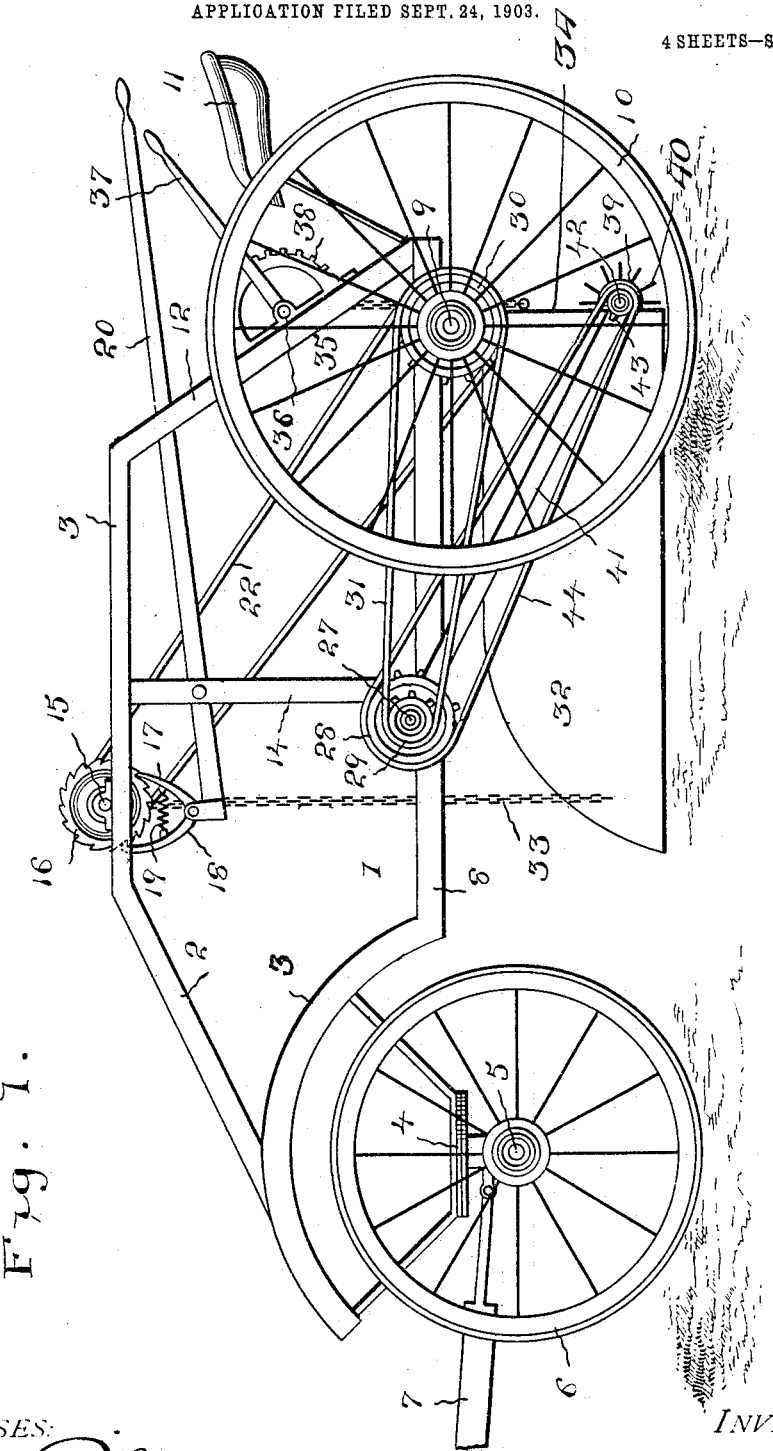
Figure 2:
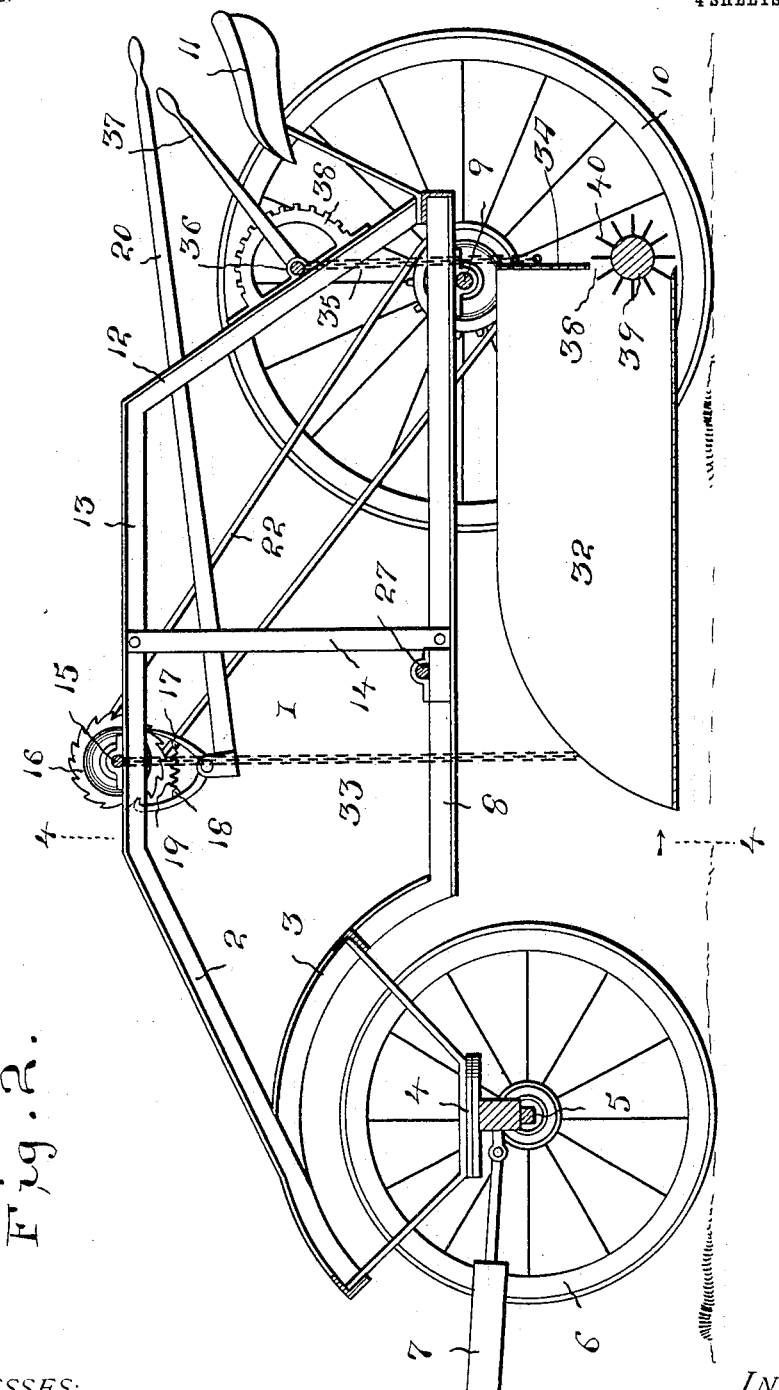
Figure 3:
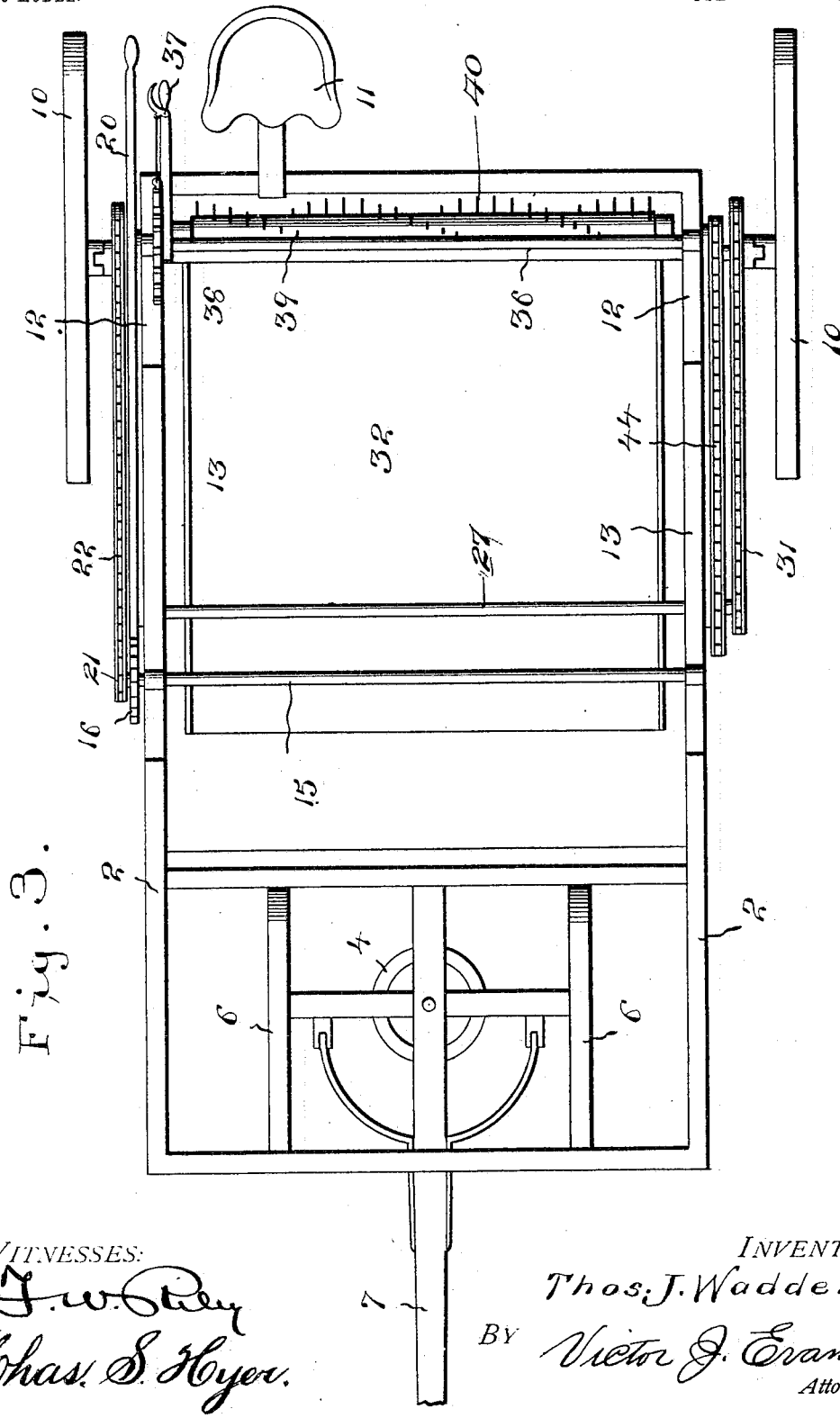
Figure 4:
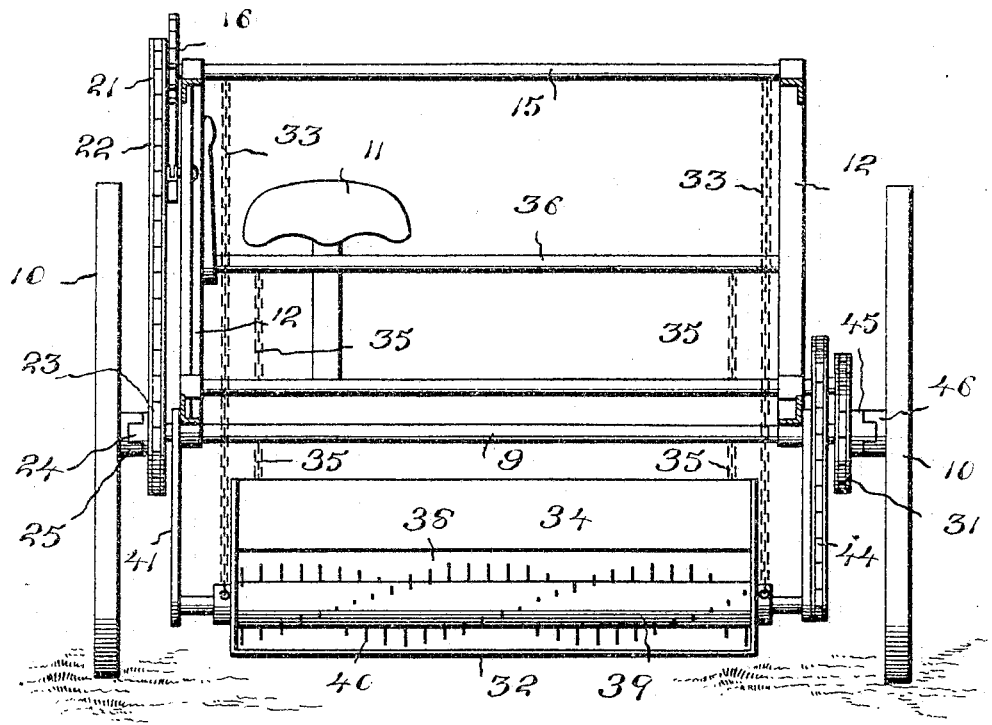
Figure 5:
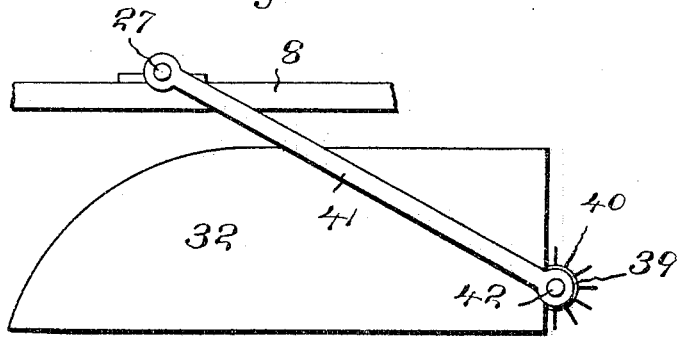

In the accompanying drawings, Figure 1 is a side elevation of a machine embodying the features of the invention. Fig. 2 is a longitudinal vertical section thereof. Fig. 3 is a top plan view of the same. Fig. 4 is a transverse vertical section on the line 4 4, Fig. 2. Fig. 5 is a side elevation of the receptacle or boat, showing the means for movably supporting the same from the main frame.

Similar numerals of reference are employed to indicate corresponding parts in the several views.

The numeral 1 designates the main frame, comprising a superstructure 2 and a front arch 3, connecting with a fifth-wheel organization 4, supported on the front axle 5, having wheels 6 and a tongue 7 or other analogous draft device. The frame 1 includes a horizontally-disposed main support 8, which is held on a rear axle 9, having wheels 10 and a driver's seat 11. The superstructure 2 has forwardly and upwardly inclined braces 12, connecting with horizontal members 13, from which depend uprights 14, extending to the main support. On the members 13 a horizontally-disposed transversely-extending winding-spindle 15 is journaled and adjacent to one end thereof carries a ratchet-wheel 16, fixed thereto and engaged by push-and-pull dogs 17 and 18, connected by a spring 19 to retain them in normal spaced relation, and both pivotally attached to the forward extremities of the elongated operating-lever 20, fulcrumed on one of the uprights 14 and extending rearwardly within easy reaching distance of the driver's seat 11. Adjacent to the ratchet-wheel 16 is a sprocket-wheel 21, encircled by a chain belt 22, running to a sprocket-wheel 23 on the axle 9 and carrying a clutch member 24, which meshes with a companion member 25, forming part of the hub of one ground-wheel 10. A suitable lever mechanism may be provided to ship and unship the sprocket-wheel with its clutch member 24 in relation to the companion clutch member 25. This shipping-leverage has not been shown, because it is an obvious addition and one well understood in the art of clutches.

The operating-lever 20, as heretofore indicated, is fulcrumed close to one of the uprights 14, and the driver's seat 11 is situated to one side of the center of the machine, as clearly indicated by Fig. 4, as it is not necessary that the said seat be centrally located in view of the fact that it will be much more of a convenience and the operation of the entire machine can be better controlled by the driver when positioned nearer one side than the other.

On the support 8 a transmitting-shaft 27 is rotatably mounted, and on one projected end thereof is keyed a large sprocket-wheel 28 and a smaller sprocket-wheel 29. On the axle 9 is a large sprocket-wheel 30, substantially of the same diameter as the sprocket-wheel 28, and running from the sprocket-wheel 30 to the sprocket-wheel 29 is a chain belt 31, which provides the driving means for the transmitting-shaft 27 from the axle 9. Suspended under the support 8 is a boat or receptacle 32, having chains 33 attached to the front fully-open extremity thereof and extending up to and connected with the winding-spindle 15, one of these chains being attached to each side of the boat or receptacle. The rear extremity of the receptacle, as shown by Figs. 1, 2, and 4, has an inclosure 34, to which suspending-chains 35 are secured and extend upwardly to an adjusting spindle or shaft 36, held on the forwardly-inclined braces 12 and operative by a hand-lever 27, having suitable means cooperating with a toothed segment 38 for locking the same, the hand-lever 37 being close to the driver's seat 11. The lower portion of the boat or receptacle 32 is formed with an opening 38, in which is rotatably mounted a spreader 39, consisting of a cylindrical body having a series of spirally-arranged blades 40. The boat or receptacle 32 is pivotally held on the transmitting-shaft 27 by fulcrum-bars 41, connected to said shaft and the terminal stubs 42 of the cylindrical body 39. On one end or attached to one of the stubs of the cylindrical body of the spreader is a sprocket-wheel 43, surrounded by a chain belt 44, extending upwardly at an angle of inclination and engaging the sprocket-wheel 28 on the transmitting-shaft 27.

The sprocket-wheel 23 is on the end of the axle 9 opposite that to which the sprocket-wheel 30 is keyed, and adjacent to said sprocket-wheel 30 and forming a part thereof is a clutch member 45, adapted to engage a companion clutch member 46 on the opposite ground or carrying wheel 10. Said sprocket-wheel 30 may be operated to throw the same into and out of engagement in relation to the ground or carrying wheel 10 by means of a suitable shifting-lever, (not shown,) whereby the several parts may be rendered inoperative in the transportation of the machine from one point to another when not in use. It will also be understood that under like circumstances the sprocket-wheel 23 will be unshipped from the other ground or carrying wheel 10.

In the operation of the machine thus far described the fertilizer is disposed in the boat 32 and the latter is adjusted to elevate the front end thereof by actuating the operating-lever 20 and ratchet-and-dog mechanism heretofore explained or throwing the clutch member 24 into engagement with the clutch member 25, which will cause the chains 33 to wind on the spindle 15, and the chains 35 will be wound on the shaft 36 through the operation of the hand-lever 37 to dispose the said boat at a proper angle, so that the fertilizer will be distributed through the opening 38 in the rear extremity thereof. At the same time the spreader 39 will be set in motion by throwing the clutch member 45 into engagement with the clutch member 46 and a regular outward feed of the fertilizer from the boat will ensue.

The arrangement of the chain belts 31 and 44 is such that the boat 32 may be adjusted in any manner desired without slackening or diminishing the tautness of said belts or interfering with their practical operation. At any time found necessary the angle of the boat 32 may be varied through the operation of the lever 20 without requiring the actuation of the sprocket-wheel 21 by the chain belt 22, and particularly when the sprocket-wheel 23 is unshipped or thrown into inoperative relation to the adjacent carrying-wheel 10.

It is apparent, of course, that I am not limited to the precise details of construction and organization of parts herein shown and described.

Having thus described the invention, what is claimed as new is—

1. In a fertilizer-distributer, the combination of a frame, a receptacle suspended thereunder, the front end of the receptacle being fully open and the rear end having a lower opening extending from the bottom upwardly to a rear inclosure, means attached to the forward and rear extremities of the receptacle for varying the angle of inclination thereof in opposite directions, and mechanism for winding the said means.

2. In a fertilizer-distributer, the combination of a wheel-frame, a receptacle adjustably suspended under the frame and having a fully-open front portion and a rear end open from the bottom upwardly and having an inclosure above said opening, a spreading device mounted in the rear end of the receptacle below said inclosure, and mechanism for rotating the spreading device and so disposed as not to be modified when the receptacle is adjusted.

3. In a fertilizer-distributer, the combination of a wheel-frame, a receptacle adjustably suspended thereunder and having a fully-open front end and a closure at the rear end, an opening being formed between the lower terminal of the closure and the bottom of the receptacle to permit the contents of the latter to be deposited through the rear end of said receptacle, and means for adjusting the front and rear extremities of the receptacle.

4. In a fertilizer-distributer, the combination of a wheel-frame supported on axles, a receptacle adjustably suspended under the frame, a rotatable spreader disposed in the lower portion of the rear end of the receptacle, a power-transmitting shaft carried by the frame, and means between the rear axle, the said shaft and the spreader for rotating the latter.

5. In a fertilizer-distributer, the combination of a frame supported on axles having wheels, a winding-shaft held on the upper part of the frame, a spindle also supported on the frame, means for operating the said spindle and shaft, a receptacle held under the frame by a flexible means attached to the shaft and spindle, a spreader rotatably mounted in the rear extremity of the receptacle, and mechanism operatable by the rear axle for rotating the spreader.

6. In a fertilizer-distributer, the combination of a frame, wheel-axles on which said frame is supported, the rear axle having driving means with clutch devices coöperating therewith, a receptacle suspended under the frame and having means for adjusting the front and rear extremities thereof, devices coöperating with part of the adjusting means for mechanically and manually actuating the same, a rotating spreader held in the rear extremity of the receptacle, and mechanism between the axle and the said spreader for operating the latter.

7. In a fertilizer-distributer, the combination of a frame, wheel-axles on which the frame is disposed, a winding-spindle supported on the upper portion of the frame and having ratchet and sprocket wheels thereon, mechanism between the rear axle and the sprocket-wheel for rotating the spindle, an operating-lever carrying push-and-pull dogs to engage the ratchet-wheel, a rear shaft having manual operating means, and a receptacle suspended under the frame by flexible devices connected to the spindle and shaft.

In testimony whereof I affix my signature in presence of two witnesses.

THOMAS J. WADDELL.

Witnesses:
A. F. TERRELL,
V. E. WALSH.